United States Patent [19]

Young

[11] Patent Number: 4,486,339

[45] Date of Patent: Dec. 4, 1984

[54] SEQUESTERING AGENT

[75] Inventor: Richard G. Young, Midland, Mich.

[73] Assignee: The Dow Chemical Company, Midland, Mich.

[21] Appl. No.: 405,219

[22] Filed: Aug. 4, 1982

[51] Int. Cl.$^3$ .......................... C11D 3/26; C11D 3/33
[52] U.S. Cl. ........................................ 252/546; 252/80; 252/180; 252/523; 252/527; 252/DIG. 11
[58] Field of Search ............... 252/527, 546, 526, 544, 252/DIG. 11, 180, 82, 523

[56] References Cited

U.S. PATENT DOCUMENTS

| | | | |
|---|---|---|---|
| 3,151,084 | 9/1964 | Schiltz | 252/527 |
| 3,578,708 | 5/1971 | Carlson | 252/DIG. 11 |
| 3,734,861 | 5/1973 | Carlson | 252/82 |
| 3,753,930 | 8/1973 | Welder | 252/DIG. 11 |
| 3,756,950 | 9/1973 | Gluck | 252/DIG. 11 |
| 3,846,325 | 11/1974 | Flynn | 252/DIG. 11 |

OTHER PUBLICATIONS

Organic Chelating Agents, Soap and Chemical Specialties, pp. 52–55, Thomas A. Downey, Feb. 1966.

*Primary Examiner*—Paul Lieberman
*Assistant Examiner*—Hoa Van Le
*Attorney, Agent, or Firm*—Douglas N. Deline

[57] ABSTRACT

A sequestering agent useful in chelation of calcium and/or magnesium ions in aqueous solution comprises by weight from about 2 percent to about 20 percent iminodiacetic acid or a water-soluble salt thereof and from about 98 percent to about 80 percent of nitrilotriacetic acid or a water-soluble salt thereof.

5 Claims, No Drawings

SEQUESTERING AGENT

BACKGROUND OF THE INVENTION

The present invention relates to a novel composition of matter having utility in the sequestering or complexing of metal ions particularly calcium and/or magnesium ions. More particularly, the present invention is concerned with a unique combination of water-soluble aminopolyacetates demonstrating improved chelation properties.

Sequestering agents are employed in a number of applications such as builders in detergent formulations to eliminate interfering effects caused by dissolved metal salts, particularly calcium or magnesium salts. Sequestering agents are also employed in other applications requiring control of metal ion content in aqueous solutions such as waste water treatment, potable water conditioning, micronutrient solubilization, gas conditioning, photographic development processing, catalysis of chemical processes, finishing and conditioning of textiles, etc.

It is previously known that water-soluble aminopolyacetates may be employed as builders for detergent compositions. In U.S. Pat. No. 3,151,084, it was disclosed that nitrilotriacetic acid and iminodiacetic acid, among others, in combination with the sodium salt of ethylenediamine tetraacetic acid may be so used.

SUMMARY OF THE INVENTION

The present invention is an improved sequestering agent comprising a mixture of from about 2 percent to about 20 percent by weight of iminodiacetic acid or a water-soluble salt thereof (IDA) and from about 98 percent to about 80 percent by weight of nitrilotriacetic acid or a water-soluble salt thereof (NTA). It has been surprisingly discovered that a sequestering agent corresponding to the above-defined range of composition provides improved sequestration or chelation, particularly of calcium and magnesium ions in aqueous solution, over the performance of each component of the composition individually, thereby resulting in a synergistic addition of chelating properties. Equally surprisingly, addition to a composition of larger amounts of IDA than called for by the present invention deleteriously affects the performance of the sequestering agent.

A preferred application of the present sequestering agent is as a detergent builder in combination with additional components such as surfactants, thereby providing an improved detergent, particularly suited for use in water containing dissolved calcium and/or magnesium ions.

DETAILED DESCRIPTION OF THE INVENTION

The water-soluble aminopolyacetates, NTA and IDA, for use herein are well-known to the skilled artisan. Equally well-known is the fact that either compound may be employed as the acid form or as a water-soluble salt such as the ammonium or alkali metal salt. Preferred for use in detergent formulations are the alkali metal salts, particularly the sodium salts. These salts are more particularly identified as trisodium nitrilotriacetic acid monohydrate ($Na_3NTA \cdot H_2O$) and disodium iminodiacetic acid monohydrate ($Na_2IDA \cdot H_2O$).

NTA or water-soluble salts thereof are known to be effective agents for the chelation of calcium ions. However, it may be demonstrated that IDA or water-soluble salts thereof are ineffective to complex or sequester calcium ions by themselves. This may be explained by reference to the negative logarithm of the stability constants, $K_{ML}$, at 25° C. fof the various calcium complexes of NTA and IDA:

| NTA | IDA |
|---|---|
| $K_{ML} = 6.4$ | $K_{ML} = 2.6.$ |
| $K_{ML2} = 8.8$ | |

Since larger values of $K_{ML}$ indicate greater effectiveness in removing ions from solution, it is readily seen that calcium is sequestered much more effectively by use of NTA chelant than by use of IDA chelant. Furthermore, based on the respective stability constants, a decrease in calcium sequestration would be expected to result from the use of a mixture of IDA and NTA. In accordance with such belief it is the normal practice of detergent formulators to require the use of extremely high purity NTA in order to obtain the highest level of calcium sequestration.

Surprisingly, it has now been discovered that small amounts of IDA, from about 2 percent to about 20 percent by weight in mixture with NTA, provide a calcium and magnesium sequestration agent of equal or improved effectiveness over that of NTA alone. In addition, when incorporated into a detergent formulation, it has been determined that the present sequestering agent can provide improved cleaning performance over that of NTA alone, especially in aqueous solutions comprising calcium and/or magnesium ions.

Preferred according to the invention is a composition comprising from about 2.5 percent to about 10 percent by weight IDA and from about 97.5 percent to about 90 percent by weight NTA.

Additionally present in the sequestering agent may be various additives and by-products of its manufacture. In particular, small amounts of a basic material such as an alkali metal hydroxide of up to several percent by weight may be present without detrimental effect. In fact in the preferred use of the instant sequestering agent as a builder for detergent compositions, such additives may serve as an alkaline source and provide beneficial effects to the detergent formulation.

The sequestering agent is preferably employed in detergent formulations as an organic builder according to well-known processes and in combination with other known detergent components. Accordingly, additional components may include one or more surfactants, such as nonionic, anionic, cationic, ampholytic or zwitterionic surfactants; bleaches, enzymes, brighteners, dyes, perfumes, antiredeposition aids, additional organic or inorganic builders, zeolites and other conventional detergency adjuncts, such as fillers, anticaking agents, soild suspending agents, suds boosters, suds depressants, anti-spotting aids, alkalinity sources, water, alcohols, glycols, etc. The seqestering agent of the invention is employed in detergent formulations in effective amounts to chelate interfering metallic ions such as calcium and/or magnesium ions. Suitably on a weight basis, the sequestering agent of the invention is present in the detergent formulation in an amount from about 5 percent to about 75 percent. Suitable proportions of surfactants and other components of a detergent formulation have been previously described in references such as U.S. Pat. No. 4,206,070, for which teaching this patent is herein incorporated in its entirety by reference.

PERFORMANCE TESTING

Chelation values for chelation of calcium were determined for NTA, IDA and mixtures by titration in the presence of oleate ion. Accordingly, standard solutions were prepared by mixing 5 ml of 0.05 M $CaCl_2$ solution with 20.0 ml of a 0.5 percent by weight sodium oleate solution and diluting with 50 ml of deionized water. Standard 0.1 M solutions of chelant (NTA, IDA or mixtures thereof) were prepared for titration. The chelant solution was then titrated into the calcium oleate until three different end-points were determined: (1) partial translucence, the point where writing is first visible through a flask containing the solution; (2) standard translucence, the point where the opacity is judged to be equivalent to a blank solution in a flask containing 20.0 ml of the 0.5 percent sodium oleate solution diluted with 50.0 ml of deionized water; and (3) complete clarity. The results are summarized in the Table I.

TABLE I

| Mole % Composition of Chelant NTA/IDA | Amount of Titrant Required (ml) | | |
|---|---|---|---|
| | Partial Translucence | Standard Translucence | Complete Clarity |
| 100/0 | 9.8 | 13.9 | 17.5 |
| 97.5/2.5 | 7.2 | 12.5 | 17.6 |
| 95/5 | 7.7 | 12.6 | 16.9 |
| 90/10 | 8.2 | 13.4 | 19.6 |
| 0/100 | — | >75.0 | — |

The results of the experiment indicate that low levels of IDA combined with NTA provide a superior sequestering agent (lower amounts of titrant used) for calcium ions than NTA alone. This is most surprising in view of the fact that IDA alone shows very little ability to satisfactorily chelate calcium ions.

In another example, the standard solutions of precipitated calcium oleate were titrated to equal clarity by 15.2 ml of a 0.1 M NTA solution and by a mixture comprising 1.0 ml of 0.1 M IDA and 12.6 ml of 0.1 M NTA solution. In other words, 1.52 mmoles of NTA were equalled in performance by 1.26 mmoles of NTA+0.1 mmole IDA.

DETERGENCY TESTING

Detergent solutions were prepared using 0.25 g of dodecyl benzene sulfonate surfactant and varying amounts of builder (NTA, IDA and mixtures thereof) in 1 liter of water of 150 ppm hardness. Water for use in the testing was prepared by dissolving 9.8 g $MgSO_4.7H_2O$ and 8.89 g $CaCl_2$ in 7 liters of deionized water and then diluting to the desired hardness concentration with additional amounts of deionized water.

Standard test fabric swatches were prepared and soiled. The fabric was a blend 65/35 of Dacron ® brand polyester/cotton soiled with a mixture comprising by weight 30 percent motor oil and 70 percent clay. Reflectance values measured before soiling were 80.5. After soiling the swatches were rinsed and dried and reflectances again measured. Swatches were sorted into groups of nearly equal reflectance for washing.

Each test swatch was individually washed for 10 minutes at 110° F. in a Terg-O-Tometer ® laboratory washer at 100 rpm. After washing each swatch was rinsed with tap water, dried and the reflectance again measured. Reflectance increase was considered a measure of the detergent's effectiveness. Results are contained in the following Table II. Duplicate trails are reported where applicable.

TABLE II

| | 150 ppm Hardness | |
|---|---|---|
| Builder NTA/IDA[a] | Amount (grams) | Reflectance gain |
| blank | | 9.1 |
| 100/0 | 0.45 | 8.4, 9.7 |
| " | 0.50 | 11.6, 12.9, 13.9 |
| " | 0.55 | 13.9, 14.2, 14.6, 14.9, 15.1 |
| " | 0.60 | 14.9, 15.1, 15.1, 16.2 |
| " | 0.65 | 16.1, 17.3, 18.0, 18.0, 18.5, 19.4 |
| 0/100 | 0.55 | 9.4 |
| " | 0.65 | 9.2, 9.1 |
| 97.5/2.5 | 0.50 | 12.1 |
| " | 0.55 | 14.0, 14.6 |
| " | 0.60 | 16.0 |
| " | 0.65 | 17.6, 18.0 |
| 95/5 | 0.50 | 11.1, 13.3 |
| " | 0.55 | 15.2, 15.3 |
| " | 0.60 | 16.6, 18.6 |
| " | 0.65 | 19.2, 19.9 |
| 92.5/7.5 | 0.50 | 11.9 |
| " | 0.55 | 12.7, 14.7 |
| " | 0.60 | 15.4, 15.6 |
| " | 0.65 | 18.0, 18.1 |
| 90/10 | 0.55 | 12.7 |
| " | 0.60 | 15.4 |
| " | 0.65 | 18.0 |

[a] weight ratio

It is seen that substantially no decrease in builder efficiency occurs when a small amount of NTA is replaced with IDA despite the fact that IDA in the absence of NTA contributes essentially no builder properties to the detergent formulation.

What is claimed is:

1. A sequestering agent comprising by weight from about 2 percent to about 20 percent iminodiacetic acid or a water-soluble salt thereof and from about 98 percent to about 80 percent nitrilotriacetic acid or a water-soluble salt thereof.

2. The sequestering agent of claim 1 comprising by weight from about 2.5 percent to about 10 percent iminodiacetic acid or a water-soluble salt thereof and from about 97.5 percent to about 90 percent nitrilotriacetic acid or a water-soluble salt thereof.

3. The sequestering agent of claim 1 comprising alkali metal salts of iminodiacetic acid and nitrilotriacetic acid.

4. The sequestering agent of claim 3 comprising sodium iminodiacetate and sodium nitrilotriacetate.

5. A detergent composition comprising a surfactant and from about 5 percent to about 75 percent by weight of the sequestering agent of claim 1.

* * * * *

Disclaimer 4,486,339.—*Richard G. Young*, Midland, Mich. SEQUESTERING AGENT. Patent dated Dec. 4, 1984. Disclaimer filed Feb. 9, 1990, by the assignee, The Dow Chemical Company.

Hereby enters this disclaimer to the remaining term of said patent.
[*Official Gazette May 15, 1990*]